US011132731B2

(12) United States Patent
Boruhovin

(10) Patent No.: US 11,132,731 B2
(45) Date of Patent: Sep. 28, 2021

(54) METHOD AND SYSTEM FOR RECOMMENDING, MONITORING, SELECTING, PURCHASING AND DELIVERING GIFTS

(71) Applicant: Elizabeth Boruhovin, Falls Church, VA (US)

(72) Inventor: Elizabeth Boruhovin, Falls Church, VA (US)

(*) Notice: Subject to any disclaimer, the term of this patent is extended or adjusted under 35 U.S.C. 154(b) by 301 days.

(21) Appl. No.: 15/323,353

(22) PCT Filed: Oct. 22, 2016

(86) PCT No.: PCT/US2016/058342
§ 371 (c)(1),
(2) Date: Dec. 30, 2016

(87) PCT Pub. No.: WO2017/070630
PCT Pub. Date: Apr. 27, 2017

(65) Prior Publication Data
US 2017/0300997 A1    Oct. 19, 2017

Related U.S. Application Data

(60) Provisional application No. 62/245,000, filed on Oct. 22, 2015.

(51) Int. Cl.
*G06Q 30/06* (2012.01)
*G06Q 30/02* (2012.01)
(Continued)

(52) U.S. Cl.
CPC ....... *G06Q 30/0631* (2013.01); *G06Q 20/102* (2013.01); *G06Q 30/0269* (2013.01); *G06Q 30/0641* (2013.01); *G06Q 50/01* (2013.01)

(58) Field of Classification Search
CPC .......... G06Q 30/0631; G06Q 30/0269; G06Q 30/0641; G06Q 20/102; G06Q 50/01
(Continued)

(56) References Cited

U.S. PATENT DOCUMENTS 7,013,290 B2    3/2006 Ananian
8,700,496 B2    4/2014 Poisson
(Continued)

FOREIGN PATENT DOCUMENTS

WO    2014195511 A1    12/2014
WO    WO-2014195511 A1 * 12/2014 ............. G06Q 30/02

OTHER PUBLICATIONS

Y. Pavlidis, M. Mathihalli, I. Chakravarty, A. Batra, R. Benson, R. Raj, R. Yau, V. Harinarayan, A. Rajaraman, M. McKiernan, Anatomy of a Gift Recommendation Engine Powered by Social Media, May 2012, Proceedings of the 2012 ACM SIGMOD International Conference on Management of Data, pp. 757-764. (Year: 2012).*

*Primary Examiner* — Jason B Dunham
*Assistant Examiner* — Brittany E Bargeon
(74) *Attorney, Agent, or Firm* — Craft Chu PLLC; Andrew W. Chu

(57) ABSTRACT

The method and system for recommending, monitoring, selecting and delivering gifts includes maintaining a transaction profile and target profile in a data network for a giver, maintaining target sub-profiles corresponding to each recipient listed in the transaction profile, transmitting an alert, presenting a gift selection menu formed by a plurality of recommended gift options, choosing a selected gift option from the gift selection menu, transmitting a notice of the selected gift option to the recipient, and storing a response. Each gift option has been identified with a target rating from a filtered array of primary factors of the target profile. The array is filtered by a target template for the primary factors. The filtered array can be revised for increased accuracy. The
(Continued)

response of the recipient includes accepting or rejecting, including re-gifting and consolidating, handling complex gift items, and revising the target templates for subsequent gifts.

19 Claims, 5 Drawing Sheets

(51) Int. Cl.
 *G06Q 20/10* (2012.01)
 *G06Q 50/00* (2012.01)
(58) Field of Classification Search
 USPC .......................................................... 705/26.7
 See application file for complete search history.

(56) References Cited

U.S. PATENT DOCUMENTS

| | | |
|---|---|---|
| 2002/0178078 A1 | 11/2002 | OToole |
| 2008/0172307 A1* | 7/2008 | Hurowitz ............... G06Q 30/08 705/26.3 |
| 2008/0189188 A1 | 8/2008 | Morgenstern |
| 2009/0234755 A1 | 9/2009 | Sidoruk |
| 2010/0023341 A1 | 1/2010 | Ledbetter et al. |
| 2010/0179857 A1 | 7/2010 | Kalaboukis et al. |
| 2011/0276689 A1 | 11/2011 | Rosen |
| 2012/0150605 A1* | 6/2012 | Isaacson ............... G06Q 20/354 705/14.25 |
| 2012/0226588 A1 | 9/2012 | Wuhrer et al. |
| 2013/0073421 A1* | 3/2013 | Poisson ................. G06Q 30/02 705/26.7 |
| 2013/0073430 A1 | 3/2013 | Gallen et al. |
| 2013/0097044 A1 | 4/2013 | Cutler |
| 2013/0097093 A1* | 4/2013 | Kolber ............... G06Q 10/1053 705/321 |
| 2013/0204739 A1* | 8/2013 | Friedman ............... G06Q 40/02 705/26.7 |
| 2014/0207610 A1 | 7/2014 | Erez et al. |
| 2015/0127481 A1 | 5/2015 | Yamba et al. |
| 2017/0083963 A1* | 3/2017 | Agarwal ............... G06F 16/951 |
| 2017/0300997 A1* | 10/2017 | Boruhovin ......... G06Q 30/0269 |

* cited by examiner

METHOD AND SYSTEM FOR RECOMMENDING, MONITORING, SELECTING, PURCHASING AND DELIVERING GIFTS

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a rule-based gift giving business method and system. In particular, the present invention relates to recommending gifts based on gift parameters for recipients, monitoring gift parameters for updates, selecting a gift option, purchasing a gift according to the gift option, and delivering the gift corresponding to the gift option to the recipient. More particularly, the present invention relates to delivery of gifts selected from a gift selection menu generated from recommended gift options identified by an array of selected factors filtered by a template.

2. Description of Related Art Including Information Disclosed Under 37 CFR 1.97 and 37 CFR 1.98

Modern consumers demand easy accessibility and immediate fulfillment, and online digital technology has created the environment, which can now accommodate these types of consumers. One consequence has been information overload, when there is too much instant information and too many choices to sort and review. Filtering online resources for the most pertinent and relevant information is a serious burden and often overwhelming task. There are also certain gifts that require the giver to be present in-person at the time of purchase and cannot be purchased online, such as cars, some financial gifts, and real property.

The process of gifting has always required time, effort and money. Surfing online has reduced the physical foot-traffic and travel with regards to shopping for a gift, but the burden of searching endless webpages and links has added a new complication to finding the best gift. Instead of driving to a brick and mortar store and walking into a retail establishment to browse merchandise, a consumer now opens a web browser, surfs multiple sites, clicks on multiple screens, and enters data over and over in order to make a purchase. To actually deliver the gift to a recipient, the consumer must click on additional screens, and locate delivery addresses for the recipient. In addition to the manual work involved with purchasing a gift, there is psychological and mental work. A giver must spend time thinking about the particular event, the recipient, and the preferences for the gift. For example, the giver may consider the preference of the recipient for a gift, the needs of the recipient, and the behavior of the recipient to actually use the gift. The giver may also need to spend time to research etiquette and social norms for a particular event, if the giver decides to consider etiquette and social norms in determining the gift and the monetary value of the gift.

Gifting has already entered the online world, and various patents and patent publications in the field of gifting online are now available. There is already disclosure of basic web-based gifting with profiles of vendors and users and transactions through a social media network or other server, such as U.S. Patent Publication No. 2009/0234755, published for Sidoruk on 17 Sep. 2009. Systems and methods for electronic processing and transmitting of gift cards are available through websites. Personal shoppers have also entered the digital space to suggest items for purchase, according to customized tastes. Personal organizers and calendar software programs have created the short cut of linking a calendar reminder to actual purchase of a gift.

U.S. Patent Publication No. 2015/01274811, published for Yamba, et al. on 7 May 2015, discloses a method and system for facilitating interactions of a user with a person in relation with the user, including procuring gifts. A profile is created for user and persons. The profile of the person includes particular variables, such as relationship, age, gender, etc. The user profile sets preferences for gift selections to be presented to the user for each person. A general rule-based gift giving process is disclosed.

U.S. Patent Publication No. 2013/0097044, published for Cutler on 18 Apr. 2013, describes the method and system for delivering greeting cards. The same user and persons are entered as profiles with set criteria for push notifications on a calendar. The settings can include reminders so that the card arrives on the day of the event, and the cards can be personalized or automatic text can be inserted.

U.S. Patent Publication No. 2013/0073430, published for Gallen et al on 21 Mar. 2013, teaches another gift giving system and method. The incorporation of social media and integration with social media profiles of persons or contacts is disclosed. The gift criteria are the same identification of the relationship of each person or contact to the user and the parameters of the gift to be given. Sponsored vendors for the gifts are disclosed.

Different versions of methods and systems of rule-based gift giving have different special features.

U.S. Patent Publication No. 2012/0226588, published for Wuhrer et al on 6 Sep. 2012, discloses another social media-based gift giving system and method with features for multiple gifts and multiple recipients at one time, such as sending all gifts for Christmas. The gift delivery includes a variation with sending bar codes to the recipient to be used at a brick and motor store location.

U.S. Patent Publication No. 2010/0023341, published for Ledbetter et al on 28 Jan. 2010, describes another rule-based gift giving method with automatic sending. The profiles for the recipients are gathered from social networking sites. The gift parameters include calendar dates, relationship to the user, and monetary range for the gift. There are default settings for groups of recipients.

U.S. Patent Publication No. 2002/0178078, published for OToole on 28 Nov. 2002, links credit card payment by the giver for business gifts from a business owner to customers, as recipients. The customers receive reminders and presents from the business, such as reminders from a doctor's office for anniversaries. The customers can have different statuses, so that priority customers receive more expensive gifts.

It is an object of the present invention to provide an improved method for gifting with any device, operating system, web browser or other digital platform.

It is an object of the present invention to provide a secure method for gifting through digital, electronic, online, and any other data connection means.

It is an object of the present invention to provide a method for gifting with time and cost efficiency.

It is an object of the present invention to provide a method for recommending, monitoring, selecting, purchasing, and delivering gifts.

It is another object of the present invention to provide an improved method for presenting a gift selection menu formed by recommended gift options corresponding to target ratings using a filtered array of a target profile of a giver.

It is still another object of the present invention to provide a method for identifying recommended gift options corresponding to target ratings in a filtered array of selected factors.

It is yet another object of the present invention to provide a method for identifying recommended gift options corresponding to target ratings in a filtered array of selected factors and target templates.

It is another object of the present invention to provide a method for identifying recommended gift options corresponding to target ratings in a double filtered array modified by selected secondary factors of the giver.

It is still another object of the present invention to provide a method for identifying recommended gift options corresponding to target ratings in a double filtered array modified by a pre-set template for secondary factors.

It is an object of the present invention to provide a method for identifying recommended gift options corresponding to target ratings in a triple filtered array related to the giver and recipient.

It is another object of the present invention to provide a method for identifying recommended gift options corresponding to target ratings in a triple filtered array of additional selected primary factors related to the recipient.

It is still another object of the present invention to provide a method for identifying recommended gift options corresponding to target ratings in a triple filtered array of additional selected primary factors and respective additional target templates.

It is yet another object of the present invention to provide a method for identifying recommended gift options corresponding to target ratings in a quadruple filtered array modified by additional selected secondary factors of the recipient.

It is yet another object of the present invention to provide a method for identifying recommended gift options corresponding to target ratings in a quadruple filtered array modified by an additional pre-set template for additional selected secondary factors.

It is an object of the present invention to provide a method for recommending, monitoring, selecting, purchasing, and delivering gifts with active learning and updating.

It is another object of the present invention to provide a method for identifying recommended gift options corresponding to target ratings in a filtered array based on revising at least one of the following: a target template, a pre-set template, an additional target template, and an additional pre-set template.

It is another object of the present invention to provide a method for identifying recommended gift options corresponding to target ratings in a filtered array based on revising the primary factors selected for the filtered array.

It is an object of the present invention to provide a method for gifting by the giver and re-gifting by the recipient.

It is another object of the present invention to provide a method for gifting by more than one giver and consolidating by the recipient.

It is an object of the present invention to provide a method for gifting for complex gift options, such as gifts with additional requirements besides payment by the giver.

It is another object of the present invention to provide an improved method for gifting with complex gift options, including titled gifts, deeded gifts, insured gifts, group gifts, and third party gifts.

It is an object of the present invention to provide a method for gifting and opening communication between the giver and the recipient through the system or on a different platform.

These and other objects and advantages of the present invention will become apparent from a reading of the attached specification.

BRIEF SUMMARY OF THE INVENTION

Embodiments of the present invention include a method and system for recommending, monitoring, selecting and delivering gifts. Gifting is a societal expectation, ranging from meaningful recognition of a special person to a casual obligation to provide some token required by etiquette. Adding the expansive range of gifts available online, the process of gifting is no longer a simple trip to a store. The present invention improves the gifting process by providing a method for recommending gift options for a particular event and recipient. Beyond a prior art calendar and reminder system, the method further includes selecting the actual gift and delivering that gift to the recipient.

The system and method of the present invention includes maintaining a transaction profile and a target profile for a giver in a data network. The transaction profile comprises personal information of a giver and a list of recipients. The transaction profile can include identity information, a security information, language selection, and payment information. The transaction profile can be populated with information entered manually or gathered from synchronized and linked accounts, which may include social network accounts. The transaction profile is intended for active users of the system with consent given for transferring money of the giver. The security information may be a password or other biometric data (voice, retina, etc.) to verify identity. The list of recipients can be gathered from manual entry or other third party sources, such as contacts lists on a mobile device in a different program or associated profiles on a social networking account. The list of recipients can be updated, suggested, and periodically reviewed for compatibility with the system by the giver or the system.

The target profile is comprised of event variables, logistic variables, identity variables, tracking variables, and preference variables. These variables can include information manually entered by the giver and gathered online or synchronized from social network accounts or derived by the system through data analysis. The data can be collected, such as GPS location, including metadata, such as the time of posting on a social media site, and data beyond alphanumeric information. The target profile corresponds to the giver. For examples, event variables can be the dates that the giver wants to send gifts; logistic variables can be the GPS location of the giver; identity variables can be the biographical data about the giver; activity variables can be the gift history of the giver; and preference variables can be the monetary amount range to be spent and gift eligibility of whether the giver wants to send a gift. The steps of maintaining the transaction profile and the target profile includes detecting missing variables to complete the respective profile and setting certain levels of completion for the transaction profile and the target profile. There can be a minimum level of information to maintain the transaction profile and the target profile.

The present invention includes the step of forming a plurality of target sub-profiles. Each recipient in the list of recipients is associated with a target sub-profile. Each target sub-profile can be comprised of event variables, logistic variables, identity variables, activity variables, and preference variables. The target sub-profiles are completed for each recipient, not the giver. There may be null values and more missing information from a target sub-profile, but the same types of variables comprise both the target profile and the target sub-profiles. There can be a minimum level of information to maintain the target sub-profiles for recipients, and the level can be much lower than the level for the transaction profile and the target profile of the giver. Other embodiments can include the recipient becoming an active participant in the system, such that the recipient creates a corresponding transaction profile with payment information. In those embodiments, the target sub-profile converts to corresponding target profile, when the recipient becomes another giver in a different gifting operation.

Transmitting an alert to the giver is another step of embodiments of the method. The alert can be based on the target profile of the giver, such as a reminder based on the event variable or a preference variable of the target profile.

Embodiments of the method and system of the present invention include presenting a gift selection menu on any data, digital, or electronic platform, including but not limited to operating systems, web browsers, mobile devices, computer terminals, gaming systems, "smart devices" and other devices with a data, radio, signal or other connection. The gift selection menu is comprised of a plurality of recommended gift options. Each recommended gift option has a target rating, and the recommended gift options of the gift selection menu having a set range of target ratings in order to qualify to be on the gift selection menu. In some embodiments, the gift selection menu can start with three to six options, but the menu can be adjusted to increase the range of target ratings and to show additional gift options.

The step of presenting the menu includes selecting the primary factors from the target profile or target sub-profile (depending upon a giver or recipient perspective), forming an array or sub-array with the selected primary factors, setting a target template or pre-set template for each selected primary factor, filtering the array with the target template or the sub-array with the pre-set template so as to form a filtered array or filtered sub-array, and identifying gift options corresponding to the target ratings for the gift selection menu. In some embodiments for the giver perspective, the array is a double filtered array, including selected secondary factors and corresponding pre-set templates. In further embodiments, the array is a triple filtered array, including the selected primary factors of the recipient. In still further embodiments, the array is a quadrupled filtered array, including the selected secondary factors of the recipient. The gift options making the gift selection menu fit the target ratings set by the levels of the array of the present invention. In embodiments from the recipient perspective, the versions of these embodiments involve the sub-array instead of the array of the giver.

Embodiments include a dynamic method and system with machine learning features. The target template can be revised according to updated information related to the corresponding selected primary factor. Similarly, on each level, the target template, the pre-set template, the additional target template for the recipient, and the additional pre-set template for the recipient can be modified according to monitoring the primary and secondary factors of both the giver and recipient. The array itself can also be revised by selecting different primary factors. The different selections of primary factors can be made according to updated information related to monitoring the primary and secondary factors of both the giver and recipient. In alternate embodiments, presenting the gift selection menu can start with a sub-array formed by selected primary factors of the recipient, instead of the giver. Consequently, the sub-array for the recipient can be revised in the same way as the array for the giver. Additionally, the updated information can also be used to revise the templates in the sub-array at any level of filtering.

The present invention further includes choosing a selected gift option from the gift selection menu, and transmitting a notice of the selected gift option to the recipient. The step of choosing can include creating a transaction identifier, verifying the monetary range of the gift, and storing the selected gift option in the gift history of the target profile of the giver and target sub-profile of the recipient as an activity variable. The notice is sent to the recipient, according to the target sub-profile. The notice is sent from the server to the smartphone or email account or mailing address of the recipient, depending upon the populated identity variables of target sub-profile.

Embodiments of the system and method of the present invention include storing a response of the recipient in the computer network. The step of storing the response includes receiving the response from the recipient. The responses can be accepting or rejecting. Accepting the gift option can include accepting the gift option for re-gifting by the recipient. In those embodiments, the recipient may create the corresponding transaction profile to act as a giver in the system. The target sub-profile is converted into another target profile, which can also include combining more than one target sub-profile into a single corresponding target profile. If a recipient has a first target sub-profile from a first giver and a second target sub-profile from a second giver, then a target profile for that recipient can combine the information from the first target sub-profile and the second target sub-profile. Accepting the gift option can also include consolidating the gift option from more than one giver or from more than one event. Rejecting the gift option includes notifying with the giver so that the gift is not purchased and the giver is not charged.

The system is the data network of a server, website, web browsers, data connections, and interface devices, like computer terminals and smartphones, which support the data network of transaction profile, target profile, and target sub-profiles. The server includes a processor, a communications interface, and a memory for storing profiles, data, templates, arrays, and sub-profiles. The processor supports software, applications, and databases for the method of the invention. The devices correspond to a giver with an interface device and each recipient, and respective interface devices, transaction profiles, target profiles, and target sub-profiles can be managed from any compatible devices, such as a computer or smartphone. Embodiments of the present invention can also include messaging and links to connect the giver through a giver interface device and recipient through a recipient interface device inside the system (through the server of the system) or outside of the system. Alternatively, the invention is a computer program product comprised of a medium with a computer readable program to be executed on a computer.

Further embodiments of the method include the additional steps for complex gift options. The system and method of the present invention handles gifts with additional requirements. The complex gift options include titled vehicles, titled property, and financial accounts. The complex gift options also include group gifts and third party gifts, such as charity donations and tuition payments.

DETAILED DESCRIPTION OF THE INVENTION

Referring to FIGS. 1-5, embodiments of the present invention include a method and system for recommending, monitoring, selecting and delivering gifts. Giving a gift has always required time to shop, including travel and driving, effort to visit a store and browse items with the recipient in mind, and money to purchase the item. Online resources and the digital age appeared to make the time and effort less physically demanding by eliminating the physical activity of shopping and gifting. However, a new problem of information overload developed. In some instances, the amount of time has increased because there are so many websites to click and view, and the amount of effort has increased because there are so many options to be considered. Even as the physical demands may be lessened, the consumer faces a mentally draining task of filtering through enormous amounts of information, much of which is not helpful in deciding on a gift, in addition to the time and emotional energy spent considering the recipient and preferences for gifts of the recipient.

Figure 1:
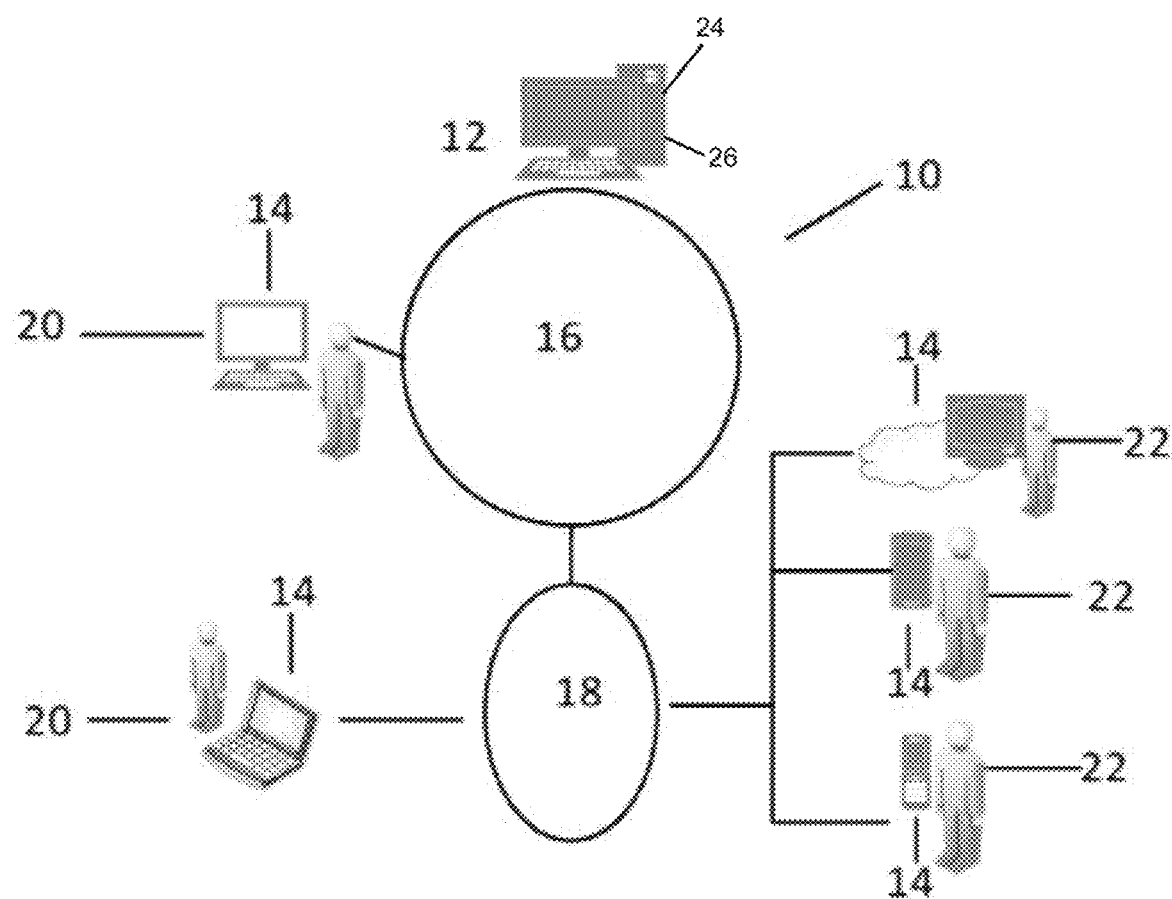
FIG. 1 is a schematic view of a flow diagram of an embodiment of the system of the present invention for a data network, showing devices, including a computer terminal and a smartphone.

The system and method of the present invention includes maintaining a transaction profile, target profile, and target sub-profiles in a data network. FIG. 1 shows a schematic illustration of an embodiment of the system 10. The system 10 has at least one server 12 comprising a processor, a communications interface, and a memory for storing the profiles and sub-profiles, and a plurality of devices 14, corresponding to individuals of each profile. A giver is associated with a transaction profile and a target profile; a recipient is associated with a target sub-profile. A giver has a transaction profile and a target profile. A recipient can start with only a target sub-profile. The variables of the target profile and the target sub-profile can be the same, so that a recipient with only a target sub-profile can be converted into a giver. The target sub-profile can become a target profile, and the recipient can complete a transaction profile, so that the recipient can fully participate in the system 10. Any device 14 is configured to connect to a data network 16 or a wireless network 18, wherein the wireless network 18 connects to the computer network 16, and wherein either a giver or a recipient may use the device 14 to access their corresponding profile. The present invention may include a computer network 16 or a mobile communications network or other data networks.

FIG. 1 shows the devices 14 as computer terminals 20 and as smartphones 22, a type of smart device. Gaming devices could also be devices 14 in the system 10. The server 12 has a processor 24 and a memory storage 26 to maintain the target profiles and target sub-profiles and process data from the giver and the recipients using a device 14. The computer terminals 20 and smartphones 22 and other devices can be the user interface for the giver and recipients to access respective profiles and sub-profiles. The giver can enter data for the transaction profile and the target profile on the device 14 of the giver, which may be a smartphone 22. The two profiles of the giver can be completed manually or automatically. Partial information from the giver, such as a linked to a social network account, phone number, email address or zip code, can be used to complete other variables in the transaction profile and the target profile. Similarly, the target sub-profile for each recipient can have partial information, manually entered, and more completed information by gathering from linked sources. Even if the target sub-profile only has an email address for a recipient, the system 10 can generate a gift option for the giver based on the transaction profile and the target profile of the giver. Each recipient can receive alerts from the giver on the device 14 of the recipient, which may also be a smartphone 22. The response of the recipient is conveyed to the giver by the wireless network 18 for the acceptance or rejection. Acceptance confirms a gift purchase and gift delivery, and rejection cancels the gift. Other embodiments of acceptance include re-gifting and consolidating. For re-gifting, the value of the gift option is accepted, and the recipient must become a giver in the system. The recipient can convert the target sub-profile into a respective target profile and a respective transaction profile, so that the value of the gift option can be used for a gift option for another. For consolidating, the value of the gift option is accepted, instead of the actual gift purchase. The recipient can compile values of gift options for a consolidated gift to be delivered to another recipient. Additionally, the devices 14 provide a visual presentation of the method of the system 10 and information about the giver, transaction profile, target profile, recipient, and recipient target sub-profile, including views of the contents of the transaction profile, target profile, and the target sub-profiles.

Figure 5:
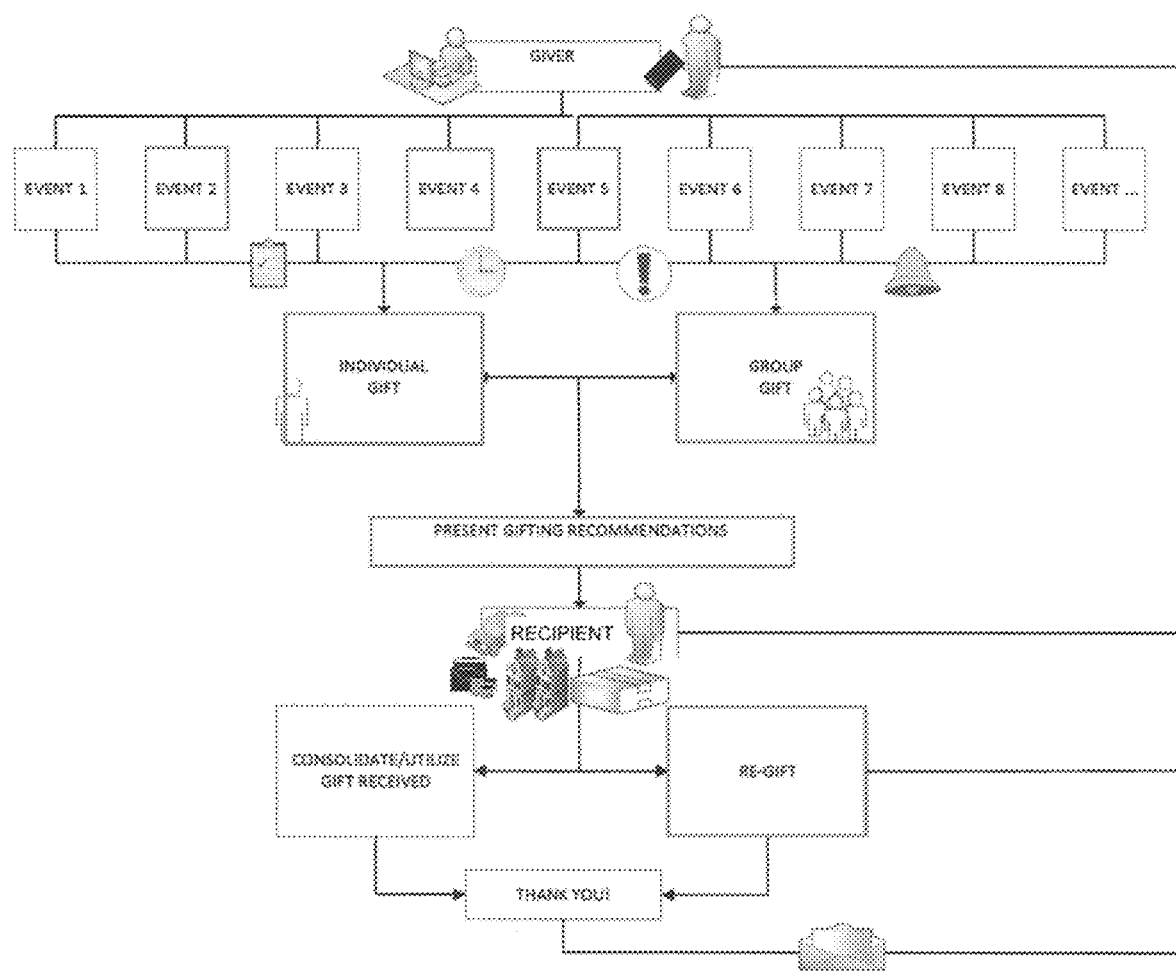
FIG. 5 is a schematic view of an illustration of the overall relationship between the giver and the recipient according to the present invention.

FIG. 5 shows an overview of the present invention, illustrating the relationship between the giver and the recipient. A giver can use any device 14 in FIG. 1 interface with the system 10. The target profile can include event variables, such as dates of events, represented as "Event 1" to "Event . . . " according to the present invention. The target profile can include preference variables, such as gift type, represented by "Individual gift" and "Group gift". The system of the present invention presents gifting recommendations, and a selected gift option is sent to the recipient. The recipient can use or consolidate the accepted gift. Alternatively, the recipient can re-gift. A reply message can be conveyed back to the giver as a "Thank you".

Figure 2:
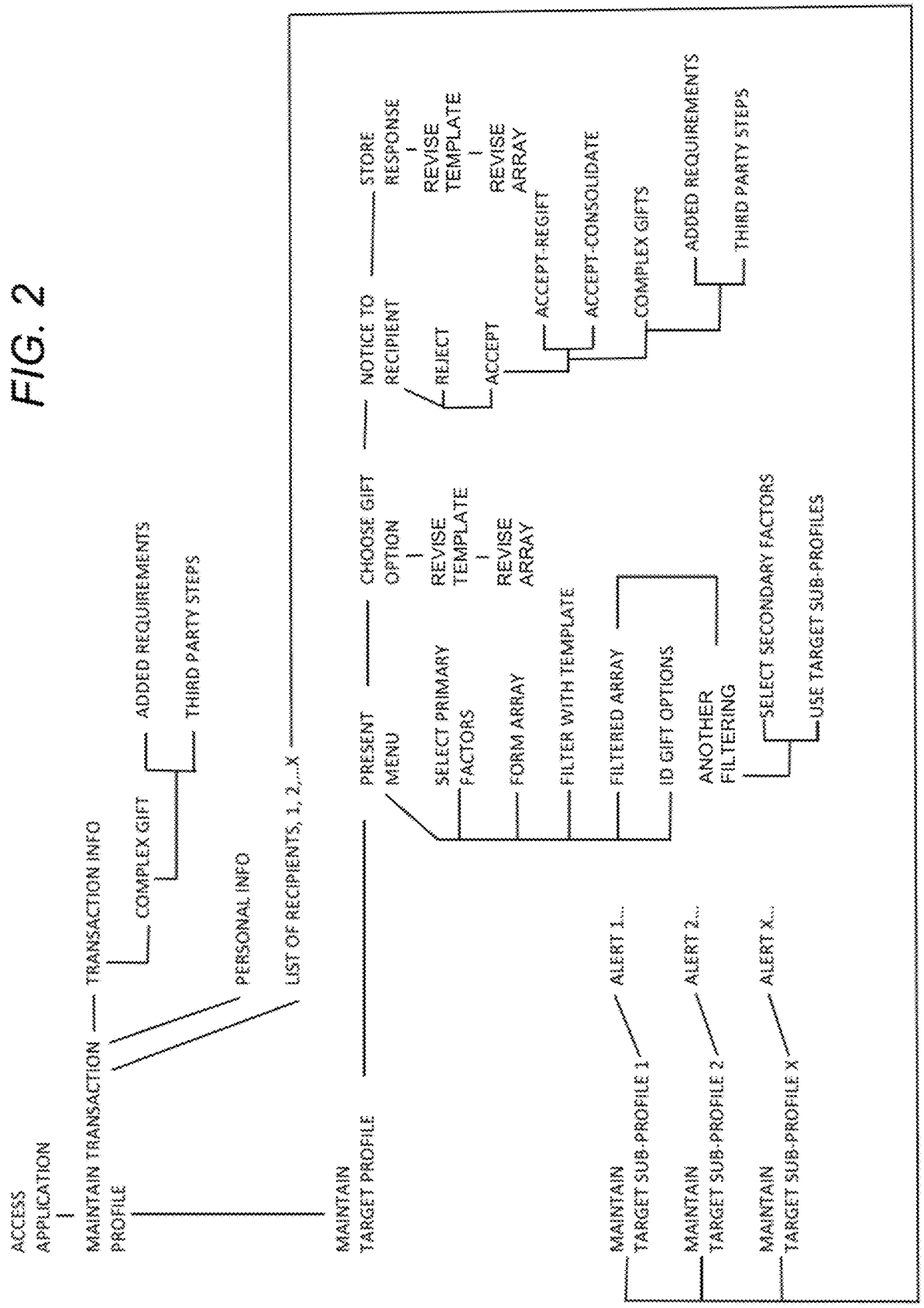
FIG. 2 is a schematic view of block diagrams, showing the method for recommending, monitoring, selecting and delivering gifts of embodiments of the present invention.
Figure 3:
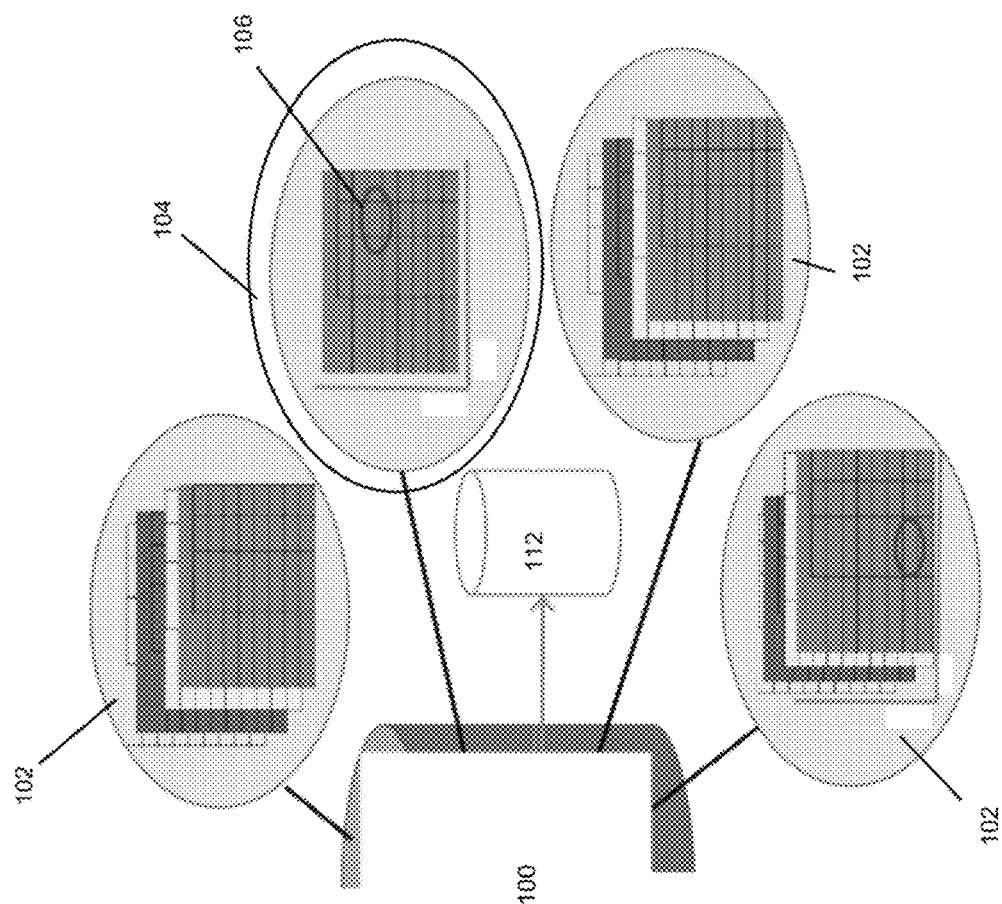
FIG. 3 is a schematic view of an illustration of the step of presenting the gift selection menu in the present invention, wherein the gift selection menu is based on identifying gift options corresponding to target ratings within a filtered array of selected primary factors.
Figure 3:
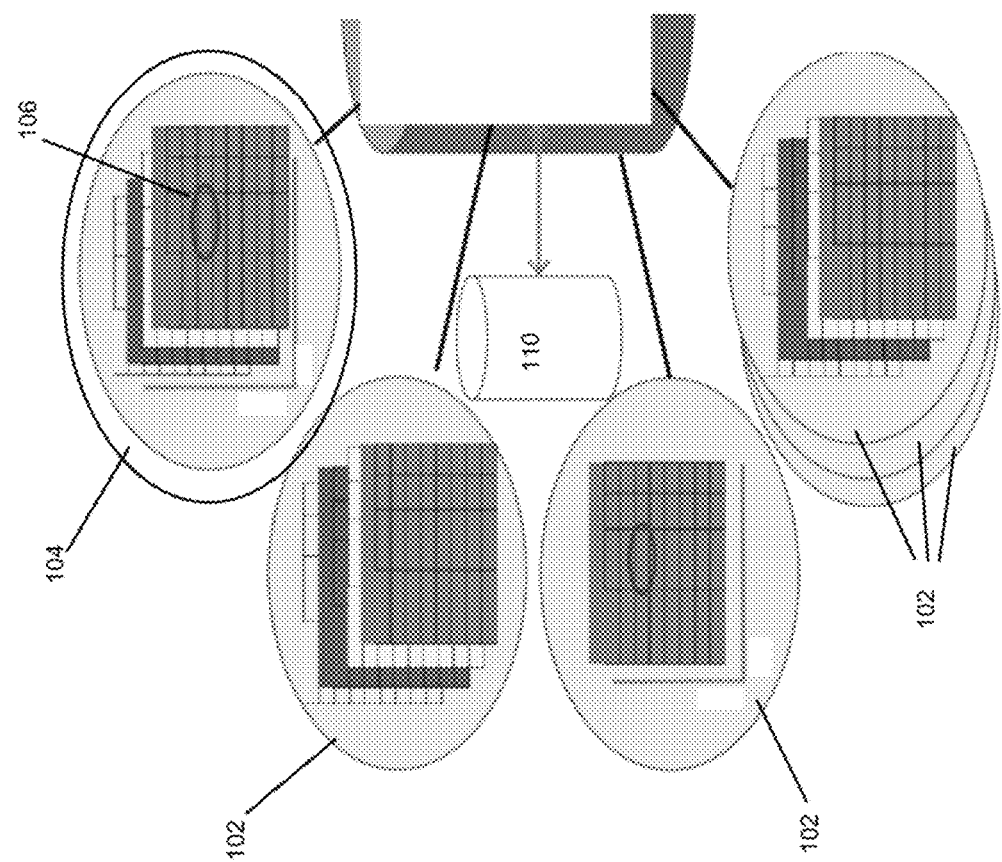
Figure 4:
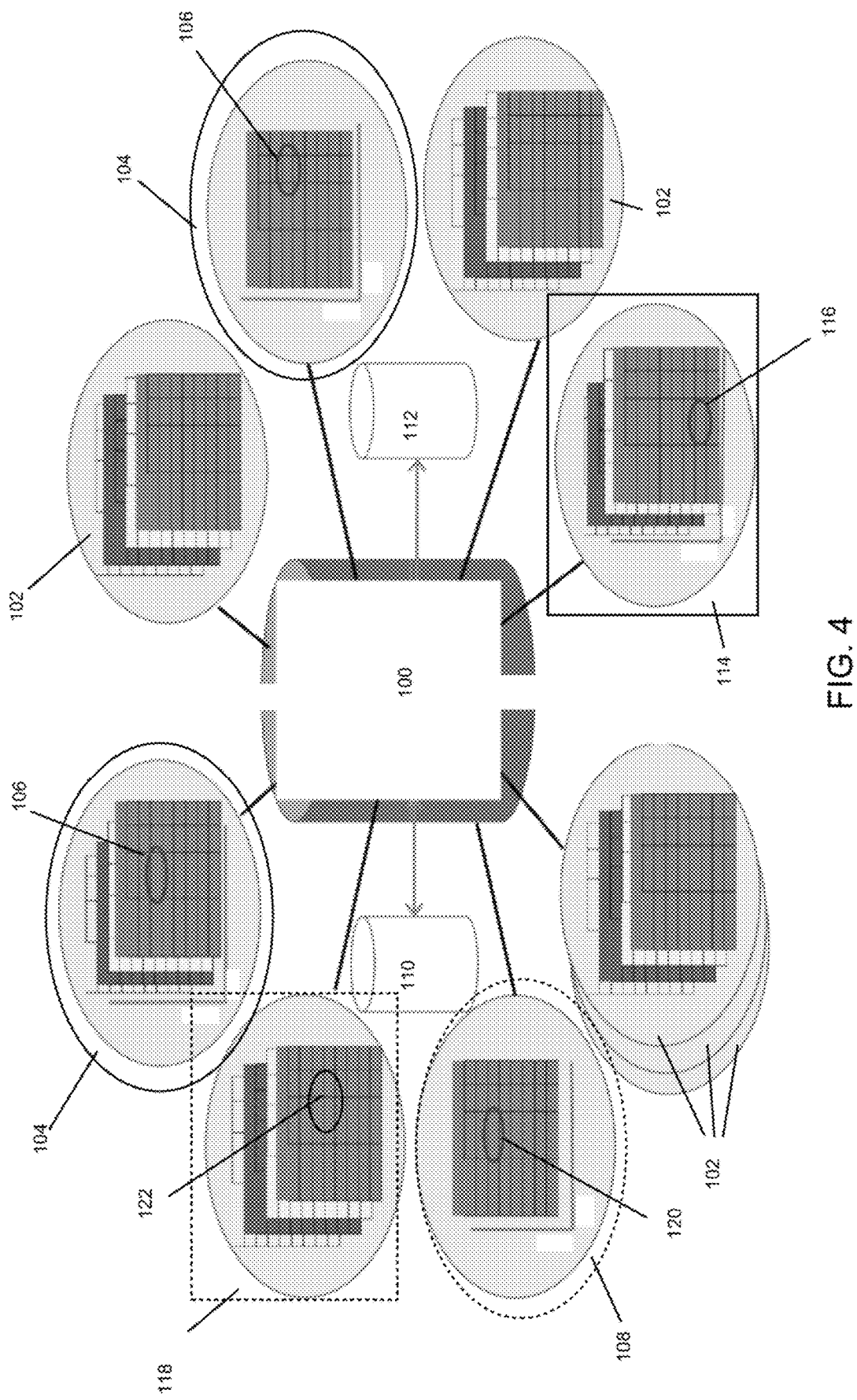
FIG. 4 is a schematic view of an illustration of the step of presenting the gift selection menu in the present invention, wherein the gift selection menu is based on identifying gift options corresponding to target ratings within a quadruple filtered array of selected primary factors, selected secondary factors, additional selected primary factors, and additional selected secondary factors.

Embodiments of the present invention include the method for recommending, monitoring, selecting and delivering gifts in FIGS. 2-4. The method of the present invention includes maintaining a transaction profile for a giver in a data network or computer network. The transaction profile is associated with the giver and includes payment information and a list of recipients. The transaction profile can include security information, giver identity information, and payment details, such as credit card numbers, for the giver. Security information may include passwords or other biometric data to confirm identity, such as voice or retina scans. The transaction profile can be required to make a financial transaction, such as a purchase, over the computer network or wireless network, so payment information is required. The transaction profile can also include other information to identify the giver, such as an event calendar, social network accounts, language selection, and the list of recipients. The system requires some accountability for a user, who spends as a giver through the system.

After gaining access to the application by computer or by another platform or device, FIG. 2 shows the step of maintaining the transaction profile. The step of maintaining also includes detecting missing data, completing missing data from information on other social network accounts of the giver, and confirming acceptance of missing data by the giver. The present invention can require a certain level of completion of the transaction profile. For example, a minimum of the payment information can be required for a transaction profile to be able to use the system 10. The certain level of completion can be entered manually or automatically by populating information from other sources linked to the transaction profile. The user as a giver on the system 10 should be financially linked to spending through the system 10. The transaction profile can also be automatically updated by the system without manual updates by the giver.

Embodiments also include maintaining the transaction profile by actively compiling the list of recipients. Besides completing from a list of contacts on a social networking account or manual entry, other third party sources can populate the list of recipients. For example, emails and electronic invitations include lists of associates, and these associates can be collected for inclusion on the list of recipients. The giver can manage the suggestions for adding these potential recipients. The list of recipients can be updated and periodically reviewed for compatibility with the system.

The giver also maintains a target profile. The target profile can be populated with information gathered from synchronized and linked social network accounts or other data sources. The target profile is comprised of event variables, logistic variables, identity variables, activity variables, and preference variables. These variables can include information gathered online or synchronized from social network accounts or manually entered by the giver. The data can be collected from devices 14, such as GPS location and metadata, such as the time of posting on a social media site. The data for the variables is not limited to alpha-numeric information, and system can account for all types of data to set the target profile and target sub-profiles.

The present invention can require a certain level of completion of the target profile. For example, a minimum of the GPS location can be required for a target profile to be able to use the system 10. Additional information can be gathered based on the GPS location, such as zip code. Zip code can gather still further information, such as socio economic status for an individual living in a particular zip code. The certain level of completion can be entered manually or automatically by populating information from other sources linked to the target profile.

Embodiments of the method of the present invention also include maintaining a target sub-profile for each recipient in the list of recipients of the transaction profile of the giver. Each recipient is associated with a target sub-profile initially created by the giver's target profile or transaction profile. The target sub-profile is also comprised of event variables, logistic variables, identity variables, activity variables, and preference variables. These variables are related to the recipient perspective, not the giver perspective, but the type of data gathering and compilation is similar. A recipient can start with only a target sub-profile. The variables of the target profile and the target sub-profile can be the same, so that a recipient with only a target sub-profile can be easily converted into a giver in the system 10. The target sub-profile can become a target profile, and the recipient can complete a transaction profile, so that the recipient can fully participate in the system 10.

Event variables can be the dates that the giver wants to send a gift to the recipient, including the day of an event or a day before the event. Examples include dates of holidays, dates of events, and other dates for gifts. The giver can edit the event variables for a particular recipient.

Logistic variables can be transaction information. Examples include the GPS location, vendor proximity, mailing address, vendor deals, and vendor partnerships. The method includes approving vendors for particular gifts with discounts or special rates for using the present invention. The discounts or special rates may also be real-time options updated by the vendors through the system 10.

Identity variables can be the biographical data. Examples include socioeconomic profile, age, hobbies, education, school attendance, cultural identity, religious identity, nationality, place of residence, purchasing behavior, online activities, customs, and relationship to giver, income level, and social network accounts. The details about the giver can be incorporated into the target profile, and the details about the recipient can be incorporated into the target sub-profile. There can be manual entry by the giver or by the recipient. The system 10 may also automatically populate these identity variables from social networking accounts or other data sources online, such as gaming profiles.

Activity variables can be the behavioral data and tracked data. Examples include reciprocal behavior, purchasing behavior, social network activity, and gift history, such as overriding the menu of the gift options and defaults for the menu of gift options. Whether the recipient gave a gift to the giver, and record of any past gift received via the system and method of the present invention can be considered in the present invention. Gifting history can include purchases (made or missed), received gifts, transaction identification, dates of purchases, time of purchases, default purchase requirements, and overrides. Overrides include instances of revisions and manual adjustment of the gift options of the gift selection menu. Another example is contact frequency or other contacts processing. Whether a giver has been texting a particular recipient and the number and frequency of the texts can be tracked. Additional processing of the list of contacts can be screened and used to affect other variables, such as gift eligibility for particular recipients.

Preference variables can be the voluntary constraints placed by the giver. Not all friends and contacts are equal, so the giver can customize gift eligibility, type of gift, monetary amount range and alert activation for a particular recipient. Gift eligibility includes whether recipients are designated for a gift or whether a gift or gift card or simple message should be sent on an event date or both. The contacts in the list of contacts from the giver profile are not all designated to receive a gift. The system can determine which contacts are designated. However, a giver can manually set the gift eligibility of each recipient, separately or in groups, to be designated so that the system and method are only performed for events with the proper gift eligibility set by the giver. The type of gift can include a gift card, product, service, asset, device, trust account, or other complex gifts. Complex gifts are gifts with additional requirements for delivery besides paying the purchase price, such as group gifts, titled property, titled vehicles, financial accounts, and tuition. Monetary amount range corresponds to the amount to be spent by the giver. Alert activation sets the frequency of reminders for gifting, such as one month before an event or a few hours before an event.

The step of maintaining the target sub-profile can also include detecting missing variables to complete a target sub-profile. The method further includes populating and completing missing information from the social network accounts of the recipients, and confirming acceptance of the missing information by the giver. For example, the birthdate of each recipient can be taken from a social network account, even if the giver does not manually enter this data to complete a target sub-profile. The present invention can require a certain level of completion of the target sub-profile. For example, a minimum of an email address can be required to include the target sub-profile in the system. The certain level of completion can be entered manually or automatically by populating information from other sources linked to the target sub-profile. The certain level of completion for a target sub-profile is different from a certain level of completion for a transaction profile or target profile of a giver. A recipient is not required to actively maintain a target sub-profile, such that a recipient can be "outside" of the system 10. The present invention can recommend gifts for a recipient, even if the corresponding target sub-profile has one or a few pieces of information. With an email address, the system 10 can still recommend a gift card. The certain level of completion can be entered manually or automatically by populating information from other sources linked to the target sub-profile.

FIG. 2 shows the step of transmitting an alert to the giver. The alert can be based on the target profile. The alert can be a reminder based on an event variable of the target profile, such as the event calendar or newly identified gifting contacts. The alert can be a reminder based on a preference variable of the target profile, such as alert activation or gift eligibility. The event variable for the date of the event can be used to determine the alert activation, and the preference variable for an early reminder can be used to transmit the alert a certain number of days or weeks before the event. The alert can be a reminder, such as a text message, email notice or even a paper letter to a mailing address to giver. Alternatively, a screen pop-up or sound can be alerts. In some embodiments, the step of transmitting comprises verifying the gift eligibility of the target profile and the gift eligibility of the target sub-profile, such that whether the giver wanted to give a gift to a particular recipient is checked. Once verified, the method of the present invention proceeds to the next step. In other embodiments, the step of transmitting comprises rejecting the gift eligibility of the target profile, when the giver decides to not give a gift to a particular recipient. The giver can refuse to give a gift for a particular alert, and the gifting stops. The refusal is recorded in the gift history as an activity variable for the target profile and the target sub-profile. The refusal is a type of override to the method of the present invention.

Embodiments of the present invention include the step of presenting a gift selection menu on any device or terminal with an interface, as shown in FIGS. 1, 2 and 5. The gift selection menu is comprised of a plurality of gift options. A visual display shows the gift selection menu, and each gift option can include the item, price, cost, tax, and vendor of a gift. The gifts can be a product, a service, a gift card, a credit for value, or an electronic gift card. There are also complex gift options, wherein the gift has additional requirements in addition to the purchase price. Complex gifts can include a titled vehicle, a tangible or intangible asset, a financial account, a trust account, a savings bond, tuition paid to a third party, and a charity donation. Each gift option also has a target rating based on the target profile. Each gift option can have a respective target rating and a respective vendor. Some versions include target ratings based on the target sub-profiles in addition to the target profile. The gift selection menu is formed by recommended gift options within a set range of target ratings in order to qualify to be on the gift selection menu. For example, the gift selection menu can start with 3-6 gift options. The gift selection menu can be adjusted to increase the range of target ratings and to show additional gift options or fewer gift options.

In the present invention, the target rating of the gift options can be based initially on the target profile of a giver or a target sub-profile of a recipient. FIGS. 3-4 show the embodiments of the step of presenting the menu 100 includes selecting primary factors of the target profile for an array (giver 110) or primary factors of the sub-profile for a sub-array (recipient 112). Any variable 102 from the event variables, logistic variables, identity variables, activity variables, and preference variables of the target profile of the giver can be a selected primary factor 104. The system can modify and update the selected primary factors 104 in either embodiment of a giver-based array or a recipient based sub-array. The giver can select or the system can select the primary factors of the array or sub-array as a default mode of operation. FIG. 3 shows two selected primary factors 104 to form the array for a menu 100 based on the giver 110. A menu based on a sub-array of the recipient 112 is also possible in the present invention. For an example, one selected primary factor 104 is a logistic variable, such as geographic location, and another selected primary factor 104 is an identity variable, such as a Chinese wedding. A target template 106 is set for each selected primary factor 104. For example, the target templates identify the US as the geographic location and a value range between 100-1000 dollars for a Chinese wedding. The target templates are applied to the array, so that only gift options corresponding to target ratings matched to the filtered array are presented in the menu 100. In some embodiments, the method can include weighting one selected primary factor over another selected primary factor in the array. A sequence of selected primary factors can also be set. The weighting and sequence can be determined by the giver or by the system. There may be a default mode of operation, and a giver may decide that physical location of the recipient and nearby vendors for lower delivery costs are weighted selected primary factors.

FIG. 4 shows another embodiment for the step of presenting the gift selection menu 100. The method includes selecting secondary factors from event variables 102, logistic variables 102, identity variables 102, activity variables 102, and preference variables 102 of target profile corresponding to the giver so as to identify selected secondary factors 114. Again, the system or the giver can select the secondary factors, and the selected secondary factors 114 can be modified. In the example of FIG. 4, the selected secondary factor 114 is an identity variable: socioeconomic status of the giver. A pre-set template 116 is set for each selected secondary factor 114. The amount of money recommended for a giver of a particular socioeconomic status can be the pre-set template. Then, the filtered array is revised according to selected secondary factors 114 and pre-set template 116 so as to form a double filtered array and only gift options corresponding to target ratings matched to the double filtered array are presented in the menu 100.

FIGS. 3 and 4 start with the array based on the giver, but information about the recipient can add to the step of presenting the gift selection menu. The method can further include selecting additional primary factors from event variables 102, logistic variables 102, identity variables 102, activity variables 102, and preference variables 102 of the respective target sub-profile corresponding to the recipient so as to identify additional selected primary factors 108. The system selects the additional selected primary factors, since the recipient may not be participating, and the system can modify the additional selected primary factors 108. In the example of FIG. 4, the additional selected primary factor 108 is an identity variable: socioeconomic status of the recipient. An additional target template 120 is set for each additional selected primary factor 108. The gift option recommended for a recipient of a particular socioeconomic status can be the pre-set template. Then, the double filtered array is revised according to additional selected primary factors 108 and the additional target template 120 so as to form a triple filtered array and only gift options corresponding to target ratings matched to the triple filtered array are presented in the menu 100.

In a further embodiment, method can include selecting additional secondary factors from event variables 102, logistic variables 102, identity variables 102, activity variables 102, and preference variables 102 of the respective target sub-profile corresponding to the recipient so as to identify additional selected secondary factors 118. The system selects the additional selected secondary factors, since the recipient may not be participating, and the system can modify these additional selected secondary factors 118. An additional pre-set template 122 is set for each additional selected secondary factor 118. Then, the triple filtered array is revised according to additional selected secondary factors 118 and the additional pre-set template 122 so as to form a quadruple filtered array and only gift options corresponding to target ratings matched to the quadruple filtered array are presented in the menu 100.

Embodiments of the invention include using one or any combination of the selected primary factors and selected secondary factors for a giver and the selected primary factors and selected secondary factors for a recipient.

The method and system of the present invention further includes revising the selection of the primary factors and secondary factors of both the giver and respective recipient. Updated information related to a selected primary or secondary factor can be used to change the corresponding array or sub-array. For example, an identity variable is profession and the template is for that profession to double a gift amount for a particular event. The identity variable of profession was previously a secondary factor, and the system can revise and learn to select profession as a selected primary factor added to the array. The system can learn by observing patterns and behavior of system users for this updated information.

Embodiments of the method and system of the present invention further also includes revising the target template, pre-set template, additional target template and additional pre-set template of both the giver and respective recipient. Updated information related to a selected primary or secondary factor corresponding to one of the templates can be used to change the filtering of the corresponding array or sub-array. For example, the giver has a new job, and the socio-economic status is changed. The range of affordable gifts is now different. The target template can include different ranges of the corresponding selected primary factor.

The steps of revising the array or sub-array and revising any template correspond to updated information related to the giver or recipient. The system is dynamic and continues to learn and refine the arrays and templates. The control of the steps of revising the array or sub-array and revising any template can be automated or manual. In one embodiment, gift history as an activity variable can be selected as a primary factor. The gift history of the giver can be used to revise the respective target template to change the amount spent for a recipient. For example, the target template may have started at USD100-400. The gift history showed an actual gift option selected at USD400. Thus, automated monitoring of the gift history results in the target template being adjusted to USD300-500. Additionally, the gift history affects the recipient, so monitoring primary factors related to acceptance of the USD400 gift correspond to the steps of revising the sub-array and templates for the recipient.

Embodiments of manual control include overrides and wish lists. An override is an activity variable as a primary factor. In the example of the target template at USD100-400, the selected gift option was USD500, an override. The giver has the manual control to change the target template within the method of the present invention. The step of presenting the gift selection menu can be based on an override as a selected primary factor. In this embodiment, the override is a dominant selected primary factor, while remaining a primary factor of the present invention. In another embodiment, the recipient wish list is a preference variable as a primary factor. In the example of the target template at USD100-400, the wish list includes USD250 and USD450. The giver has manual control to list both USD250 and USD450 over the target template, a wish list of specific gift options to be on the menu. The step of presenting the gift selection menu can be based on a wish list as a selected primary factor. In this embodiment, the wish list is a dominant selected primary factor, while remaining a primary factor within the method of the present invention.

Fully completed transaction profiles, target profiles, and target sub-profiles for all users in the system as both givers and recipients allows the system to present the best gift selection menu to all givers. The filtering and revisions can produce ideal gift options. Even with less than full completion of the profiles and sub-profiles, the system and method presents an improved gift selection menu to any giver with at least some information in the profiles and sub-profiles. A gift selection menu can be presented for a giver, even if a recipient is only identified with an email address in the target sub-profile.

The present invention further includes choosing a selected gift option from the gift selection menu by the giver. The giver controls the step of choosing the gift option in the process. The giver can actively control or set a default in the transaction profile so that the step of choosing is automatic without need for further giver actions to send a gift. The gift selection menu filters the wide expanse of the online resources to a focused group of better suited gift options for consideration. The gift options are pre-screened and determined by the invention, so that the giver is not required to weigh the factors already entered into the target sub-profile of the recipient. All gift options with a target rating suitable to be included on the gift selection menu are identified. In some embodiments, the step of choosing the selected gift option includes creating a transaction identifier based on the giver profile. The transaction identifier can be comprised of one of the following: a phone number of the giver, recipient phone number, a unique code, and a unique time stamp of a date, hour, minute and second. The transaction identifier is a unique identifier to be associated with the selected gift option and for redemption by the recipient. The step of selecting the gift option is also recorded as gift history, an activity variable of the target profile and target sub-profile.

Embodiments of the step of choosing the selected gift option can also include verifying the monetary amount range. For example, when faced with specific gift options, the giver can still manually change the amount or gift type so that a larger or smaller value gift can be given. In examples of gift cards or even financial investments, the amount can be adjusted by the giver. Consequently, the step of choosing the selected gift option can also include modifying the monetary amount range and storing the modified monetary amount range in the target profile and the target sub-profile for a particular recipient. The modified gift option is verified, and the change is stored in the target profile to be used for an improved gift selection menu for a subsequent gift by the giver.

Transmitting a notice of the selected gift option to the recipient is the next step of the present invention. The notice is sent to the recipient according to the recipient, according to the target profile or target sub-profile, for example, a notice is sent from the server to the smartphone or email account of the recipient or mailing address of the recipient. The identity variables of the target sub-profile include contact information for the recipient. The power has moved to the recipient to determine the next step.

Embodiments of the system and method of the present invention include storing a response of the recipient in the computer network. The response can be acceptance or rejection. These responses are stored in the gift history of the target profile of the giver and the target sub-profile of the recipient, so that the gift selection menu is further refined for subsequent gift selection menus. The response may affect the target ratings in a subsequent step of presenting the gift selection menu for both the giver and the recipient in the future.

The step of storing the response includes receiving the response from the recipient. The recipient may email or click a link to indicate the response. The recipient may enter a response to the system by any device connected to the system.

When the response is acceptance by the recipient, the method of the invention includes confirming acceptance of the selected gift option, and verifying the acceptance to the giver. Then, the invention includes purchasing the selected gift option by the giver with the giver profile, contacting a selected vendor corresponding to the selected gift option, forwarding payment information to the selected vendor from the giver, and confirming delivery of a gift corresponding to the selected gift option from the selected vendor to the recipient. In embodiments with the transaction identifier, the step of purchasing includes confirming the transaction identifier based on the giver profile.

In some embodiments of the invention, gift options include complex gift items. A complex gift item is comprised of a gift and additional gift requirements, besides the purchase price. Additional requirements can be gifting a car or trust account. For example, proof of insurance and transferring the title are required in addition to money for the car. Identity proof and other tax information are required in addition to money to fund a trust account or other financial instrument. These additional requirements may also have to be completed in person. The method includes the steps of completing the additional requirements, in lieu of the giver personally visiting the vendor.

Another complex gift item is a group gift, the additional requirements being a plurality of givers and respective transaction profiles and respective target profiles. In this embodiment of the method, each filtered array of each target profile identifies the group gift, and each pre-set range of each target template filters for the group gift. A giver or the system can control the filtering to identify the group gift.

Another complex gift item is a third party gift, the additional requirements being an independent recipient identified to accept on behalf of the recipient. For a gift of tuition or a charitable donation, the recipient does not receive the actual gift. A third party, such as the university or charity organization receives the payment. The method includes completing these additional requirements. A third party gift can also be a group third party gift, such as several relatives giving for tuition for one recipient. In this embodiment of the method, the additional requirements include a plurality of givers and respective transaction profiles and respective target profiles. Each filtered array of each target profile identifies the group gift, and each pre-set range of each target template filters for the group gift. Each target profile and each transaction profile can be used to transfer funds to a third party on behalf of the recipient. The giver or the system can control the filtering to a particular gift and vendor.

The gift history, an activity variable, is updated based on the response to accept the gift option. In some embodiments, the method includes paying a fee to the system by the recipient or by the giver or any another party participating in the system, such as a vendor or advertiser. Paying the fee can be part of forwarding payment information to the selected vendor.

When the response is acceptance by the recipient, the method of the invention can include confirming the target sub-profile by the recipient, adding to the target sub-profile by the recipient, and presenting an option to create a corresponding transaction profile for the recipient and to convert the target sub-profile into a corresponding target profile, when the recipient is a giver. Certain information may need to be verified to continue, such as mailing address. It is optional for the recipient to become active in the system to manage a transaction profile and a target profile and to become a user with both giver and recipient capability.

When the response is rejection by the recipient, one embodiment of the method includes confirming rejection of the selected gift option, and verifying the rejection to the giver. If a gift option is pre-paid, then the method includes returning a credit amount to the giver corresponding to a value of the gift to the giver. If there has been no purchase, and the vendor is not involved, then the response is stored as gift history of the target profile and target sub-profile. If the system of the present invention received funds from the giver, the transaction profile is credited with the amount or the money is refunded to the giver. Even if the response is rejection, the method of the invention can include confirming the target sub-profile by the recipient, adding to the target sub-profile by the recipient, and presenting an option to create a corresponding transaction profile and converting the target sub-profile into a corresponding target profile for the recipient. In addition, the recipient can block the giver from gifting to the recipient through the system.

When the response is acceptance by the recipient and when the recipient wishes to re-gift, an alternate embodiment of the method includes confirming acceptance of the selected gift option, verifying the acceptance to the giver, converting value of the selected gift option into a credit amount, converting the target sub-profile to a corresponding target profile through another interface device of the recipient, forming a corresponding transaction profile through that interface device by the recipient to become another giver, and adding the credit amount corresponding to a value of the gift to the recipient in the corresponding transaction profile. The step of converting the target sub-profile to a corresponding target profile includes combining more than one target sub-profile into a single target profile. For example, a recipient may be receiving gift options to more than target sub-profile because of different email addresses. The recipient has a first target sub-profile and a second target sub-profile, and the information from these sub-profiles can be used to form the target profile and transaction profile as a giver. The recipient can confirm identity and combine the target sub-profiles into a single target sub-profile, which is also a corresponding target profile. The recipient can now act as a user in the system in order to send a gift through the corresponding transaction profile and corresponding target profile. The recipient is prompted to create a corresponding transaction profile and corresponding target profile in order to re-gift. The recipient is no longer only in the system of the present invention by the recipient profile to the giver. The recipient for re-gifting must become a giver with a transaction profile. Another gift selection menu is presented through the recipient interface device connected to the server through the data network to the recipient as another giver. That gift selection menu for another giver is comprised of plurality of other gift options, including at least one gift option having any portion of the selected gift value of the original gift, while corresponding to a vendor of said another giver. Further embodiments include repeating the steps of present invention with the recipient as a giver or re-giver with the credit amount as part of the transaction profile and target profile. Other embodiments include adding another credit amount to the corresponding transaction profile. More than one gift option can be consolidated and repurposed by the recipient as a re-gifting giver. Different gift options, including gifts of different value and different currencies, can be consolidated in the present invention. For example, gift cards from different vendors can be consolidated to be re-gifted from another different vendor. Gift options from different events can also be consolidated.

Embodiments of the present invention include the additional step of transmitting a message to the giver, after the step of storing the response, and linking the giver and the receiver on a different communication platform. The message can express gratitude, and the giver and recipient are released from the system to communicate directly with each other.

The present invention does not remain static. The target templates and the target sub-templates are revised to provide more appropriate gift options. The arrays and sub-arrays are revised by selecting different primary factors. The default mode of operation for the arrays can also be adjusted. Further embodiments of the present invention include revising the target template based on the response, revising the target sub-template based on the response, and revising the target template based on the selected gift option. The pre-set ranges of each primary factor can be adjusted. A selection report comprised of the primary factors of the selected gift option is generated, and the pre-set ranges are modified to include the primary factors of the selected gift option. A similar selection report can be applied to the target sub-template. When the selected gift option is an override of the gift selection menu, the gift selection menu can be modified by the target template so that a subsequent gift selection menu would be corrected according to past history. Variables are tracked so that the information can be used to modify the templates and default modes of operation. There are defaults, but the defaults can be modified by the system.

Additional embodiments of the present invention include a computer program product comprised of a computer useable medium having a computer readable program. The program can be executed on a computer with a processor and memory for the method of the recommending, monitoring, selecting and delivering gifts.

The present invention provides an improved method and system for gifting online for any device platform. Computers, mobile devices and other compatible devices, can download the software or application for the present invention so that no special equipment or hardware is required. The security protection for access to the giver profile and the additional transaction identifier for any actual purchase in the system addresses security for this method for gifting online. The gift selection menu reduces time spent and effort expended for gifting with online resources. Presenting the gift selection menu includes monitoring the alerts for sending a gift, and recommending gift options. The method of the present invention includes a gift selection menu formed by gift options corresponding to target ratings within a filtered array of a target profile of a giver. The filtered array is based on primary factors set by the giver or by the system in as a default mode of operation and a target template with pre-set ranges by the system. The considerations relevant to the giver and suggestions from the system in the template are used to identify the gift options for the gift selection menu. The filtered array can be revised by weighted and sequenced primary factors of the giver, secondary factors of the giver, or a filtered sub-array of a particular recipient. The target template can also be revised. Overrides and defaults can be used to adjust pre-set ranges, so that tracked variables can increase the accuracy of identifying gift options with an improved chance of being selected. The system and method evolves to provide better and better gift options to the giver, so that the giver spends less time and energy in the gifting process.

Besides recommending gift options, the present invention further enables selecting a gift option and delivering the gift of the gift option after purchasing. The present invention can perform the action of physical delivery of the gift in addition to presenting the gift selection menu. The present invention also handles complex gift items so that delivery of group gifts, titled gifts, and third party gifts can be identified for givers and recipients through the filtered arrays. The additional requirements for the complex gift items will still be completed by either the giver or the recipient or both.

The present invention also incorporates a method for accepting a selected gift option for re-gifting or consolidating by the recipient. The system expands the number of users as givers by providing an easy way for recipients to join as givers or re-gifting givers. The recipient can become a giver, and the steps for monitoring, recommending, selecting and delivering gifts can be repeated for a recipient as giver or a re-giver.

Other advantages of the present invention include opening communication between the giver and recipient on a different platform. After confirmation messages, the method includes prompting a link for continued communication by text or by email outside of the system. Also, the method for gifting offers settings with advance notice reminders for coordinating selecting a gift for an event and delivery date on the day of the event and default setting options for automatic sending of a gift. The transaction profile and target profile can be set for advanced planners and last-minute shoppers, and even prevent missed birthdays with automatic delivery of gifts for a particular recipient.

The foregoing disclosure and description of the invention is illustrative and explanatory thereof. Various changes in the details of the described method can be made without departing from the true spirit of the invention.

I claim:

1. A method for recommending, monitoring, selecting and delivering gifts, the method comprising:
   maintaining a transaction profile in a data network, wherein said transaction profile comprises personal information of a giver and a list of recipients, wherein said transaction profile is secured;
   maintaining a target profile in said data network, wherein said target profile comprises information related to said giver, said target profile being comprised of event variables, logistic variables, identity variables, activity variables, and preference variables for said giver, wherein said target profile has a certain level of target profile completion;
   forming a plurality of target sub-profiles on a server connected to said data network, wherein each recipient in said list of recipients is associated with a target sub-profile, each target sub-profile being comprised of event variables, logistic variables, identity variables, activity variables, and preference variables for each recipient, wherein each target sub-profile has a certain level of target sub-profile completion, said certain level of target profile completion being different from said certain level of target sub-profile completion;
   presenting a gift selection menu through a giver interface device connected to said server through said data network, said gift selection menu being comprised of a plurality of gift options, each gift option having a target rating and a vendor, said gift options of said gift selection menu having a set range of target ratings, wherein said target rating is based on both said target profile and said target sub-profile;
   choosing a selected gift option from said plurality of gift options in said gift selection menu by said giver through said giver interface device, said selected gift option having selected gift value and a corresponding vendor;
   transmitting a notice of said selected gift option to said recipient through a recipient interface device connected to said server through said data network, according to said target sub-profile of said recipient;
   storing a response of said recipient to said notice of said selected gift option in said target profile and said target sub-profile on said server, wherein said response is a gift history variable in said target profile and said target sub-profile,
   wherein said step of presenting said gift selection menu through said giver interface device comprises:
      selecting primary factors from event variables, logistic variables, identity variables, activity variables, and preference variables of said target profile corresponding to said giver so as to identify selected primary factors;
      forming an array of said selected primary factors of said target profile;
      setting a target template for each selected primary factor in said array;
      filtering said array with at least one target template of at least one selected primary factor of said array so as to form a filtered array; and
      identifying said gift options corresponding to target ratings within said filtered array;
   revising said target template on said server; and
   repeating the step of presenting said gift selection menu, after the step of revising said target template,
   wherein the step of revising said target template is based on updated information corresponding to a respective selected primary factor,
   wherein at least one activity variable is gift history,
   wherein at least one selected primary factor is said gift history,
   wherein the step of revising said target template comprises the step of:
      automatically forming said array of said selected primary factors of said target profile with said gift history,
   wherein said transaction profile is comprised of a default setting for automatic gifting for a particular recipient,
   wherein the step of choosing said selected gift option from said plurality of gift options in said gift selection menu by said giver through said giver interface device comprises the step of:
      automatically choosing said selected gift option for said particular recipient, said method further comprising the steps of:
      automatically purchasing said selected gift option by said giver with said transaction profile through said interface device;
      contacting a selected vendor corresponding to said selected gift option through said data network;
      forwarding payment information to said selected vendor from said interface device by said giver; and
      confirming delivery of a gift corresponding to said selected gift option from said selected vendor to said recipient through said data network.

2. The method for recommending, monitoring, selecting and delivering gifts, according to claim 1, wherein said step of presenting said gift selection menu through said giver interface device comprises:

selecting secondary factors from event variables, logistic variables, identity variables, activity variables, and preference variables of said target profile corresponding to said giver so as to identify selected secondary factors;

setting a pre-set template for each selected secondary factor; and revising said filtered array according to selected secondary factors so as to form a double filtered array before the step of identifying said gift options, wherein said gift options correspond to target ratings within said double filtered array.

3. The method for recommending, monitoring, selecting and delivering gifts, according to claim 2, wherein said step of presenting said gift selection menu through said giver interface device comprises:

selecting primary factors from event variables, logistic variables, identity variables, activity variables, and preference variables of said target sub-profile corresponding to said recipient so as to identify additional selected primary factors;

setting an additional target template for each additional selected primary factor;

revising said double filtered array according to said additional selected primary factors so as to form a triple filtered array before the step of identifying said gift options, wherein said gift options correspond to target ratings within said triple filtered array.

4. The method for recommending, monitoring, selecting and delivering gifts, according to claim 3, wherein said step of presenting said gift selection menu through said giver interface device comprises:

selecting additional secondary factors from event variables, logistic variables, identity variables, activity variables, and preference variables of said target sub-profile corresponding to said recipient so as to identify additional selected secondary factors;

setting an additional pre-set template for each additional selected secondary factor; and revising said triple filtered array according to additional selected secondary factors so as to form a quadruple filtered array before the step of identifying said gift options, wherein said gift options correspond to target ratings within said quadruple filtered array.

5. The method for recommending, monitoring, selecting and delivering gifts, according to claim 4, further comprising steps of:

revising at least one of said target template, said pre-set template, said additional target template, and said additional pre-set template; and repeating the step of presenting said gift selection menu, after the step of revising said at least one of said target template, said pre-set template, said additional target template, and said additional pre-set template, wherein the step of revising at least one of said target template, said pre-set template, said additional target template, and said additional pre-set template is based on updated information corresponding to a respective selected primary factor, a respective selected secondary factor, a respective additional selected primary factor, and a respective additional selected secondary factor of said target template.

6. The method for recommending, monitoring, selecting and delivering gifts, according to claim 4, further comprising steps of:

revising said array by selecting different primary factors; and repeating the step of presenting said gift selection menu, after the step of revising said array, wherein the step of revising said array is based on updated information corresponding to a respective selected primary factor, a respective selected secondary factor, a respective additional selected primary factor, and a respective additional selected secondary factor of said target template.

7. The method for recommending, monitoring, selecting and delivering gifts, according to claim 1, further comprising steps of:

revising said array on said server by selecting different primary factors; and repeating the step of presenting said gift selection menu, after the step of revising said array, wherein the step of revising said array is based on updated information corresponding to a respective selected primary factor.

8. The method for recommending, monitoring, selecting and delivering gifts, according to claim 1, wherein said step of presenting said gift selection menu through said giver interface device comprises:

selecting additional primary factors from event variables, logistic variables, identity variables, activity variables, and preference variables of said target sub-profile corresponding to said recipient so as to identify additional selected primary factors;

forming an additional array of said additional selected primary factors of said target sub-profile;

setting an additional target template for each additional selected primary factor in said additional array;

filtering said additional array with at least one additional target template of at least one additional selected primary factor of said array so as to form an additional filtered array; and identifying said gift options corresponding to target ratings within said additional filtered array.

9. The method for recommending, monitoring, selecting and delivering gifts, according to claim 8, wherein said step of presenting said gift selection menu through said giver interface device comprises:

selecting additional secondary factors from event variables, logistic variables, identity variables, activity variables, and preference variables of said target sub-profile corresponding to said recipient so as to identify additional selected secondary factors;

setting an additional pre-set template for each additional selected secondary factor; and revising said filtered array according to additional selected secondary factors so as to form a double filtered array before the step of identifying said gift options, wherein said gift options correspond to target ratings within said double filtered array.

10. The method for recommending, monitoring, selecting and delivering gifts, according to claim 8, further comprising steps of:

revising said additional target template; and repeating the step of presenting said gift selection menu, after the step of revising said additional target template.

11. The method for recommending, monitoring, selecting and delivering gifts, according to claim 10, wherein the step of revising said additional target template is based on updated information corresponding to a respective additional selected primary factor.

12. The method for recommending, monitoring, selecting and delivering gifts, according to claim 1,
wherein event variables are comprised of dates of holidays, dates of events, and dates for gifts,
wherein logistic variables are comprised of geographic location, vendor proximity, vendor partnerships, mailing address, and global positioning system data,
wherein identity variables are comprised of socioeconomic profile, biographical information, cultural identity, religion, nationality, residence, purchasing behavior, customs, etiquette, relationship to giver, relationship to each recipient, income level, social network accounts, and online activity,
wherein activity variables are comprised of reciprocal behavior, purchasing behavior, and gift history, and
wherein preference variables are comprised of gift eligibility, monetary amount range, gift type, and alert activation.

13. The method for recommending, monitoring, selecting and delivering gifts, according to claim 1, wherein said selected gift option is a complex gift item, said complex gift item being comprised of a gift and additional gift requirements, and wherein said step of storing said response comprises:
confirming acceptance of said selected gift option through said recipient interface device;
verifying said acceptance to said giver interface device of said giver; and
completing said additional gift requirements.

14. The method for recommending, monitoring, selecting and delivering gifts, according to claim 13, wherein said complex gift item is a group gift, said additional requirements being a plurality of givers with respective transaction profiles and respective target profiles through respective interface devices.

15. The method for recommending, monitoring, selecting and delivering gifts, according to claim 1, wherein said target rating is based on both said target profile and two target sub-profiles
wherein the step of transmitting said notice of said selected gift option to said recipient is comprised of transmitting said notice of said selected gift option to respective recipients through recipient interface devices connected to said server through said data network, according to each target sub-profile of said two target sub-profiles of respective recipients, and
wherein the step of storing said response of said recipient is comprised of storing each response of each recipient to said notice of said selected gift option in said target profile and corresponding target sub-profiles of said two sub-profiles on said server, wherein said response is a gift history variable in said target profile and corresponding target sub-profiles of said two sub-profiles on said server.

16. A method for recommending, monitoring, selecting and delivering gifts, the method comprising:
maintaining a transaction profile in a data network, wherein said transaction profile comprises personal information of a giver and a list of recipients, wherein said transaction profile is secured;
maintaining a target profile in said data network, wherein said target profile comprises information related to said giver, said target profile being comprised of event variables, logistic variables, identity variables, activity variables, and preference variables for said giver, wherein said target profile has a certain level of target profile completion;
forming a plurality of target sub-profiles on a server connected to said data network, wherein each recipient in said list of recipients is associated with a target sub-profile, each target sub-profile being comprised of event variables, logistic variables, identity variables, activity variables, and preference variables for each recipient, wherein each target sub-profile has a certain level of target sub-profile completion, said certain level of target profile completion being different from said certain level of target sub-profile completion;
presenting a gift selection menu through a giver interface device connected to said server through said data network, said gift selection menu being comprised of a plurality of gift options, each gift option having a target rating and a vendor, said gift options of said gift selection menu having a set range of target ratings, wherein said target rating is based on both said target profile and said target sub-profile;
choosing a selected gift option from said plurality of gift options in said gift selection menu by said giver through said giver interface device, said selected gift option having selected gift value and a corresponding vendor;
transmitting a notice of said selected gift option to said recipient through a recipient interface device connected to said server through said data network, according to said target sub-profile of said recipient; and
storing a response of said recipient to said notice of said selected gift option in said target profile and said target sub-profile on said server, wherein said response is a gift history variable in said target profile and said target sub-profile,
wherein at least one logistic variable of said target profile is comprised of a GPS location of a giver interface device associated with said giver,
wherein the step of maintaining said target profile is comprised of the step of:
gathering said GPS location of said giver interface device, said target profile being comprised of said GPS location of said giver device,
wherein said target rating is based on said GPS location of said giver interface device of said target profile,
wherein at least one logistic variable of at least one target sub-profile is comprised of a GPS location of a recipient interface device associated with a corresponding recipient,
wherein the step of forming said at least one target sub profile is comprised of the step of:
gathering said GPS location of said recipient interface device, said at least one target profile being comprised of said GPS location of said recipient device, and
wherein said target rating is based on both said GPS location of said giver interface device of said target profile and said GPS location of said recipient interface device for a corresponding target sub-profile.

17. The method for recommending, monitoring, selecting and delivering gifts, according to claim 16,
wherein event variables are comprised of dates of holidays, dates of events, and dates for gifts,
wherein logistic variables are comprised of geographic location, vendor proximity, vendor partnerships, mailing address, and global positioning system data, wherein identity variables are comprised of socioeconomic profile, biographical information, cultural identity, religion, nationality, residence, purchasing behavior, customs, etiquette, relationship to giver, relationship to each recipient, income level, social network accounts, and online activity, wherein activity variables are comprised of reciprocal behavior, purchasing behavior, and gift history, and wherein preference variables are comprised of gift eligibility, monetary amount range, gift type, and alert activation.

18. A method for recommending, monitoring, selecting and delivering gifts, the method comprising:

maintaining a transaction profile in a data network, wherein said transaction profile comprises personal information of a giver and a list of recipients, wherein said transaction profile is secured, wherein said transaction profile has a certain level of transaction profile completion, wherein the step of maintaining said transaction profile is comprised of the step of:

automatically populating said transaction profile to said certain level of transaction profile completion from sources linked to said transaction profile through said data network;

maintaining a target profile in said data network, wherein said target profile comprises information related to said giver, said target profile being comprised of event variables, logistic variables, identity variables, activity variables, and preference variables for said giver, wherein said target profile has a certain level of target profile completion, and wherein the step of maintaining said target profile is comprised of the step of:

automatically populating said target profile to said certain level of target profile completion from sources linked to said target profile through said data network;

forming a plurality of target sub-profiles on a server connected to said data network, wherein each recipient in said list of recipients is associated with a target sub-profile, each target sub-profile being comprised of event variables, logistic variables, identity variables, activity variables, and preference variables for each recipient, wherein each target sub-profile has a certain level of target sub-profile completion, said certain level of target profile completion being different from said certain level of target sub-profile completion, and wherein the step of maintaining said target sub-profile is comprised of the step of:

automatically populating said target sub-profile to said certain level of target sub-profile completion from sources linked to said target sub-profile through said data network;

presenting a gift selection menu through a giver interface device connected to said server through said data network, said gift selection menu being comprised of a plurality of gift options, each gift option having a target rating and a vendor, said gift options of said gift selection menu having a set range of target ratings, wherein said target rating is based on both said target profile and said target sub-profile;

choosing a selected gift option from said plurality of gift options in said gift selection menu by said giver through said giver interface device, said selected gift option having selected gift value and a corresponding vendor;

transmitting a notice of said selected gift option to said recipient through a recipient interface device connected to said server through said data network, according to said target sub-profile of said recipient;

storing a response of said recipient to said notice of said selected gift option in said target profile and said target sub-profile on said server, wherein said response is a gift history variable in said target profile and said target sub-profile;

requesting said recipient to complete said target sub-profile through said recipient interface device;

requesting said recipient to complete another transaction profile for said recipient, said target sub-profile being another target profile, when said recipient is another giver;

maintaining another target profile in said data network, wherein said another target profile comprises information related to said another giver, said another target profile being comprised of event variables, logistic variables, identity variables, activity variables, and preference variables for said another giver, wherein said another target profile has a certain level of another target profile completion;

presenting another gift selection menu through said recipient interface device connected to said server through said data network to said recipient as another giver, said another gift selection menu being comprised of plurality of other gift options, each other gift option having another target rating and another vendor, said other gift options of said another gift selection menu having another set range of other target ratings, wherein said other target rating is based on said another target profile, wherein at least one gift option has at least a portion of said selected gift value and corresponds to a vendor of said another giver, and wherein said step of presenting said gift selection menu through said giver interface device comprises:

selecting primary factors from event variables, logistic variables, identity variables, activity variables, and preference variables of said target profile corresponding to said giver so as to identify selected primary factors;

forming an array of said selected primary factors of said target profile;

setting a target template for each selected primary factor in said array;

filtering said array with at least one target template of at least one selected primary factor of said array so as to form a filtered array; and identifying said gift options corresponding to target ratings within said filtered array;

revising said target template on said server; and repeating the step of presenting said gift selection menu, after the step of revising said target template, wherein the step of revising said target template is based on updated information corresponding to a respective selected primary factor, wherein at least one activity variable is gift history, wherein at least one selected primary factor is said gift history, and wherein the step of revising said target template comprises the step of:

automatically forming said array of said selected primary factors of said target profile with said gift history.

19. A method for recommending, monitoring, selecting and delivering gifts, the method comprising:

maintaining a transaction profile in a data network, wherein said transaction profile comprises personal information of a giver and a list of recipients, wherein said transaction profile is secured, wherein said transaction profile has a certain level of transaction profile completion, wherein the step of maintaining said transaction profile is comprised of the step of:
automatically populating said transaction profile to said certain level of transaction profile completion from sources linked to said transaction profile through said data network;

maintaining a target profile in said data network, wherein said target profile comprises information related to said giver, said target profile being comprised of event variables, logistic variables, identity variables, activity variables, and preference variables for said giver, wherein said target profile has a certain level of target profile completion, and wherein the step of maintaining said target profile is comprised of the step of:
automatically populating said target profile to said certain level of target profile completion from sources linked to said target profile through said data network;

forming a plurality of target sub-profiles on a server connected to said data network, wherein each recipient in said list of recipients is associated with a target sub-profile, each target sub-profile being comprised of event variables, logistic variables, identity variables, activity variables, and preference variables for each recipient, wherein each target sub-profile has a certain level of target sub-profile completion, said certain level of target profile completion being different from said certain level of target sub-profile completion, and wherein the step of maintaining said target sub-profile is comprised of the step of:
automatically populating said target sub-profile to said certain level of target sub-profile completion from sources linked to said target sub-profile through said data network;

presenting a gift selection menu through a giver interface device connected to said server through said data network, said gift selection menu being comprised of a plurality of gift options, each gift option having a target rating and a vendor, said gift options of said gift selection menu having a set range of target ratings, wherein said target rating is based on both said target profile and said target sub-profile;

choosing a selected gift option from said plurality of gift options in said gift selection menu by said giver through said giver interface device, said selected gift option having selected gift value and a corresponding vendor;

transmitting a notice of said selected gift option to said recipient through a recipient interface device connected to said server through said data network, according to said target sub-profile of said recipient;

storing a response of said recipient to said notice of said selected gift option in said target profile and said target sub-profile on said server, wherein said response is a gift history variable in said target profile and said target sub-profile;

requesting said recipient to complete said target sub-profile through said recipient interface device;

requesting said recipient to complete another transaction profile for said recipient, said target sub-profile being another target profile, when said recipient is another giver;

maintaining another target profile in said data network, wherein said another target profile comprises information related to said another giver, said another target profile being comprised of event variables, logistic variables, identity variables, activity variables, and preference variables for said another giver, wherein said another target profile has a certain level of another target profile completion; and presenting another gift selection menu through said recipient interface device connected to said server through said data network to said recipient as another giver, said another gift selection menu being comprised of plurality of other gift options, each other gift option having another target rating and another vendor, said other gift options of said another gift selection menu having another set range of other target ratings, wherein said other target rating is based on said another target profile, wherein at least one gift option has at least a portion of said selected gift value and corresponds to a vendor of said another giver, wherein at least one logistic variable of said target profile is comprised of a GPS location of a giver interface device associated with said giver, wherein the step of maintaining said target profile is comprised of the step of:
gathering said GPS location of said giver interface device, said target profile being comprised of said GPS location of said giver device, and wherein said target rating is based on said GPS location of said giver interface device of said target profile.

* * * * *